(12) United States Patent
Cheben et al.

(10) Patent No.: US 7,680,371 B2
(45) Date of Patent: Mar. 16, 2010

(54) INTERFACE DEVICE FOR PERFORMING MODE TRANSFORMATION IN OPTICAL WAVEGUIDES

(75) Inventors: Pavel Cheben, Ottawa (CA); Siegfried Janz, Ottawa (CA); Dan-Xia Xu, Ottawa (CA); Jens Schmid, Ottawa (CA); Adam Densmore, Orleans (CA); Jean Lapointe, Ottawa (CA)

(73) Assignee: National Research Council of Canada, Ottawa, ON (CA)

( * ) Notice: Subject to any disclaimer, the term of this patent is extended or adjusted under 35 U.S.C. 154(b) by 144 days.

(21) Appl. No.: 11/874,789

(22) Filed: Oct. 18, 2007

(65) Prior Publication Data

US 2008/0193080 A1    Aug. 14, 2008

Related U.S. Application Data

(60) Provisional application No. 61/207,863, filed on Feb. 13, 2007.

(51) Int. Cl.
*G02B 6/42* (2006.01)
*G02B 6/028* (2006.01)

(52) U.S. Cl. .............................. 385/28; 385/37; 385/50; 385/124

(58) Field of Classification Search ................... 385/28, 385/31, 37, 39, 49, 50, 123–132
See application file for complete search history.

(56) References Cited

U.S. PATENT DOCUMENTS 5,577,141 A * 11/1996 Adar et al. .................... 385/43
6,293,688 B1 * 9/2001 Deacon ....................... 362/556
6,937,799 B2 * 8/2005 Matsushima et al. .......... 385/50
6,951,715 B2 * 10/2005 Cunningham et al. .......... 435/4
7,058,261 B2 * 6/2006 Ghiron et al. ................. 385/36
2005/0185915 A1 * 8/2005 Yu et al. ...................... 385/146

OTHER PUBLICATIONS

Nanotaper for compact mode conversion—Vilson R. Almeida, Roberto, R. Panepucci & Michal Lipson, 2003 Optical Society of America Optics Letters Vo. 28, No. 15 Aug. 1, 2003.
Monolithically integrated asymmetric graded and step-index couplers for microphotonic waveguides—Delage, Janz, Lamontagne, Bogdanov et al, Jan. 9, 2006 vol. 14, No. 1 Optics Express.
Dual Grating-Assisted Directional Coupling Between Fibers and Thin Semiconductor Waveguides—Masanovic, Passaro, Member IEEE and Graham Reed—IEEE Photonics Technology Letters, vol. 15, No. 10, Oct. 2003.

(Continued)

*Primary Examiner*—Sarah Song
(74) *Attorney, Agent, or Firm*—Marks & Clerk; Richard J. Mitchell

(57) ABSTRACT

An interface device for performing mode transformation in optical waveguides includes an optical waveguide core for propagating light of a particular wavelength or a plurality of wavelengths. The optical waveguide core terminates in a subwavelength grating configured to change the propagation mode of the light. The subwavelength grating has a pitch sufficiently less than the wavelength of the light to frustrate diffraction. The device can thus serve as an optical coupler between different propagating media, or as an anti-reflective or high reflectivity device.

15 Claims, 10 Drawing Sheets

OTHER PUBLICATIONS

A Very Short Planar Silica Spot-Size Converter Using a Nonperiodic Segmented Waveguide—Spuhler, Offrein, Bona, Germann, Massarek, Emi—Journal of Lighwave Technology, vol. 16, No. 9, Sep. 1998.

Mode Tapering Via Tapered Channel Waveguide Segmentation, Z. Weissman and A. Hardy, Electronics Letters, Jul. 30, 1992, vol. 28, No. 16, pp. 1514-1516.

* cited by examiner

FDTD, ANTIREFLECTIVE, R = 0.00248

LOW REFLECTIVITY

BOTH HIGH AND
LOW REFLECTIVITY

INTERFACE DEVICE FOR PERFORMING MODE TRANSFORMATION IN OPTICAL WAVEGUIDES

CROSS REFERENCE TO RELATED APPLICATION

This application claims the benefit under 35 USC 119(e) prior U.S. application Ser. No. 11/674,405, filed Feb. 13, 2007 and which has been converted to provisional application 61/207,863 under 37 CFR 1.53 (c)(2).

FIELD OF THE INVENTION

This invention relates to the field of optical waveguides, and in particular to an interface device for performing mode transformation in such waveguides.

BACKGROUND OF THE INVENTION

The capability to modify properties of waveguide modes in optical waveguides is a fundamental prerequisite for making optical waveguide devices for many applications areas of integrated optics, photonics, and optoelectronics. One such area is the coupling of light between compact planar waveguides and the outside macroscopic world. A low efficiency of this coupling is a major practical problem in the design and fabrication of integrated microphotonic devices. Various proposals have been made to address this problem, but the coupling still remains a challenge particularly for waveguides of sub-micrometer dimensions made in high index contrast (HIC) materials such as III-V semiconductors, silicon oxynitride, and silicon-on-insulator (SOI). Very compact planar waveguide devices can be made in these materials. In SOI waveguides, light is highly confined in the silicon core which can have cross-sections on the order of 200 nm×200 nm or less, and bending radii can be reduced to a few micrometers. Beside the potential for chip size reduction, the benefit of integration of the mainstream microelectronic technology with photonics has been the main driving force in the emerging field of silicon photonics with significant recent improvements in fabrication technology and many novel structures and devices reported, including modulators, lasers, and arrayed waveguide gratings (AWGs).

Due to the large mode effective index and mode size disparities, the optical coupling between an optical fiber and a high index contrast waveguide with a small cross-section is largely inefficient. In order to match a large optical fiber mode to a HIC waveguide mode with an area typically two orders of magnitude smaller, in plane and out-of-plane mode size transforming structures need to be used.

Various techniques are known for mode manipulation in planar waveguide devices. Mode size transforming structures in both the in-plane and out-of-plane directions are conceptually simple, but the out-of-plane tapering requires complex fabrication techniques such as gray-scale lithography, which is not yet a standard technique in the industry. Grating couplers [G. A. Masanovic et al., Dual grating-assisted directional coupling between fibers and thin semiconductor waveguides, IEEE Photon. Technol. Lett. 15, 1395, 2003] have been demonstrated, but their fabrication is demanding, and polarization and wavelength sensitivity is typically large. An interesting approach is to use an inversely tapered waveguide that adiabatically narrows down to a width of about 100 nm or less as the waveguide approaches the facet facing the fiber [V. R. Almeida et al., Nanotaper for compact mode conversion, Opt. Lett. 28, 1302, 2003]. The waveguide effective index is reduced by narrowing the waveguide width, which causes the mode to expand and to eventually match that of the fiber. However, drawbacks of this technique are problems with fabrication reproducibility of the thin taper tip and polarization dependent loss (PDL). As well, this method is mainly suitable for channel waveguides of sub-micrometer size. An alternative approach is to use a coupler with a planar graded-index (GRIN) lens [A. Delage et al., Monolithically integrated asymmetric graded and step-index couplers for microphotonic waveguides, Optics Express 14, 148, 2006]. The structure acts as an asymmetric GRIN lens that is the planar analogue of the conventional cylindrical GRIN lens. The GRIN coupler can be made very compact, about 15 μm in length. However, a reproducible growth of thick GRIN layers requires a material growth development that may add to the fabrication complexity and device cost.

Other forms of mode transformers have also been proposed. Long-period grating couplers have been demonstrated [Z. Weissman and A. Hardy, 2-D mode tapering via tapered channel waveguide segmentation, Electron. Lett. 28, 1514, 1992] for low index contrast waveguides such as those made in a silica-on-silicon platform, but their application in HIC waveguides is hindered by the reflection and diffraction losses incurred at the boundaries of different segments. Such couplers are also comparatively large, i.e. a few hundred micrometer long. To reduce the reflection loss, a non-periodic irregular lateral tapering has been proposed [M. M. Spühler et al., A very short planar silica spot-size converter using a nonperiodic segmented waveguide, J. Lightwave Technol. 16, 1680, 1998]. Still, such mode transformers are quite large (>100 μm in length), the coupling loss reduction is rather modest (~2 dB) and insufficient for most practical devices.

Thus, it will be appreciated that the ability to manipulate modes in optical waveguides is an essential prerequisite for making integrated waveguide structures and devices. In this invention, a general mechanism is disclosed that can control the waveguide mode propagation in a prescribed manner with little or no detrimental effects such as loss penalty or higher order mode conversion.

A specific example where the need for an efficient mode transformation is essential are junctions between waveguides fabricated from different materials, for example using deposition, growth, or heteroepitaxy, as it is often used when joining together waveguides with different functionalities, for example active (lasers, modulators, photodetectors) and passive waveguide structures. The waveguide effective mode index mismatch at such junctions results in insertion loss and return loss penalties and also in higher order mode excitation. The latter needs to be avoided in devices that rely on single-mode operation, as is the case for most state-of-the-art photonic waveguide devices.

Another important factor affecting the coupling of waveguides to the outside world is the reflectivity of the waveguide facets. Facets are typically formed either by etching or by cleaving with or without a successive polishing step. The reflectivity of the thus fabricated facet is determined by the materials that comprise the waveguide and by the waveguide geometry. Very often, however, there is a need to be able to control the reflectivity of the facets in order to achieve certain device functionalities or to improve device performance. A typical example is the need for low or high reflectivity facets for distributed feedback lasers, optical amplifiers or external cavity semiconductor lasers.

Currently, changing the reflectivity of waveguide facets is done by coating the facet with a single layer or a multilayer of dielectric or metallic films. This process has to be performed at the chip level after the actual formation of the facets by the cleaving or etching process. If a facet with high reflectivity is required for a device this can only be achieved by the deposition of metals or complex multilayer structures comprised of different materials. In addition to the complexity of fabrication these coatings can also introduce additional thermal and mechanical problems to devices.

SUMMARY OF THE INVENTION

The invention offers a new method of mode transformation using a subwavelength grating (SWG) where the SWG period $\Lambda$ is less than the $1^{st}$ order Bragg period. This makes the grating diffraction effect frustrated in the waveguide. It is a distinct advantage of this method that, unlike in conventional waveguide grating structures based on diffraction, the SWG mechanism is non-resonant, and hence intrinsically wavelength insensitive.

Thus, according to a first aspect of the invention there is provided an interface device for performing mode transformation in optical waveguides, comprising a first optical waveguide core for propagating light of a particular wavelength or a plurality of wavelengths; said optical waveguide core comprising a subwavelength grating configured to modify the propagation mode of the light; and said subwavelength grating having pitch sufficiently less than the wavelength of the light to frustrate diffraction.

It will be understood that waveguides may be designed for a range of wavelengths, and the nature of the subwavelength grating is that it should have a pitch small enough, preferably shorter than the first order Bragg period, to frustrate diffraction of light of any particular wavelength designed to be carried by the waveguide.

According to another aspect of the invention there is provided an optical waveguide device comprising a cladding; a first waveguide core extending in a longitudinal direction on said cladding for propagating a waveguide mode of a particular wavelength or plurality of wavelengths; and a longitudinal subwavelength grating etched into said waveguide core proximate an end face thereof, said grating having a series of grating elements formed from said core and having pitch sufficiently less than the wavelength of the light beam to frustrate diffraction; and said subwavelength grating providing said waveguide core with an effective mode index that varies toward said end face.

According to another aspect of the invention there is provided an optical interface device for transmitting light propagating between a first medium and a second medium with different refractive indices, comprising at least one cladding; a waveguide core providing said first medium and extending in a longitudinal direction and having an end face exposed to said second medium, a subwavelength grating transversely disposed on said end face, said grating having protrusions defining tapered gaps therebetween to introduce a gradual change in effective mode index in a transition region between said first and second media.

According to a still further aspect of the invention there is provided an optical interface device for positioning at a boundary between first and second media of different effective mode indices, comprising an optical waveguide having an end face and providing said first medium through which light can propagate in a direction normal to said end face; and a subwavelength grating on said end face having a pitch sufficiently less than the wavelength of the light to frustrate diffraction, said grating defining peaks and valleys which have a predetermined phase difference between them for light propagating in the substrate in a direction normal to the end face so as to determine the reflection/transmission properties of the end face for the light propagating within the substrate, said grating being configured as sub-wavelength grating for light propagating in one direction only whereas for the opposite direction it is configured as diffraction grating, said directions being forward and backward propagating directions.

The proposed mechanism can help resolve various outstanding difficulties in waveguide optics and photonics. For example, a major problem in the planar waveguide microphotonic devices is coupling between compact planar waveguides and the outside macroscopic world, usually an optical fibre. Due to the large mode effective index and mode size disparities, the optical coupling between an optical fiber and a planar waveguide with a small cross-section is largely inefficient. In order to match a large optical fiber mode to a planar waveguide mode with an area that can be up to two orders of magnitude smaller in some waveguide platforms, e.g. the so-called high index contrast (HIC) waveguides, mode size transforming structures in both the in-plane and out-of-plane directions need to be used. Current devices for this function are difficult and/or costly to fabricate.

A fundamental aspect of the invention is the modification of light propagation in the waveguide by SWG structures, wherein the waveguide effective index is gradually changed by an SWG structure. Alternatively, the propagation of light in the waveguide is modified by SWG structure creating either a graded-index boundary or wave interference effects, the latter refer to constructive or destructive interference in certain directions.

The method can be used for making a variety of waveguide structures, such as fiber-chip couplers, waveguide buttjoints, high and low reflectivity waveguide facets and apertures, aperture apodizers, phase shifters, etc.

In this specification, it will be understood that term mode transformation refers to any mechanism wherein the phase and/or field distribution of the waveguide mode of the light is changed. For example, it could be a mode size modification to match different mode sizes in different waveguides, or a transfer between media of different refractive indices, or merely a reversal of the direction of propagation, as in the case of a mirror. Another example is a mode conversion between fundamental and higher order modes, or between modes with different polarizations. The mechanism applies to different types of waveguide modes, i.e. propagating, leaky, and evanescent modes, with the former being of most practical relevance in state-of-the-art devices. It also will be understood that the term optical is not limited to the visible wavelength range, but also includes infrared and ultraviolet in accordance with conventional usage.

The invention can be implemented in any kind of waveguide, such as channel or slab planar optical waveguides and optical fibers. Optical fibers typically consist of a cylindrical core embedded in a cladding, which has a lower refractive index than the core. Unlike planar optical waveguides, such a structure forms a waveguide with cylindrical symmetry.

BRIEF DESCRIPTION OF THE DRAWINGS

The invention will now be described in more detail, by way of examples only, with reference to the accompanying drawings, in which.

DETAILED DESCRIPTION OF EMBODIMENTS OF THE INVENTION

According to the homogenization theory or effective-medium theory, a composite medium comprising different materials combined at subwavelength scale ($\Lambda<\lambda$) can be approximated as a homogeneous media and its effective index can be expressed as a power series of the homogenization parameter $\chi=\Lambda/\lambda$, where $\Lambda$ is the grating period (pitch) and $\lambda$ is the wavelength of light in the medium. The coupler principle is based on gradual modification of the waveguide mode effective index by the SWG effect.

Figure 1A:
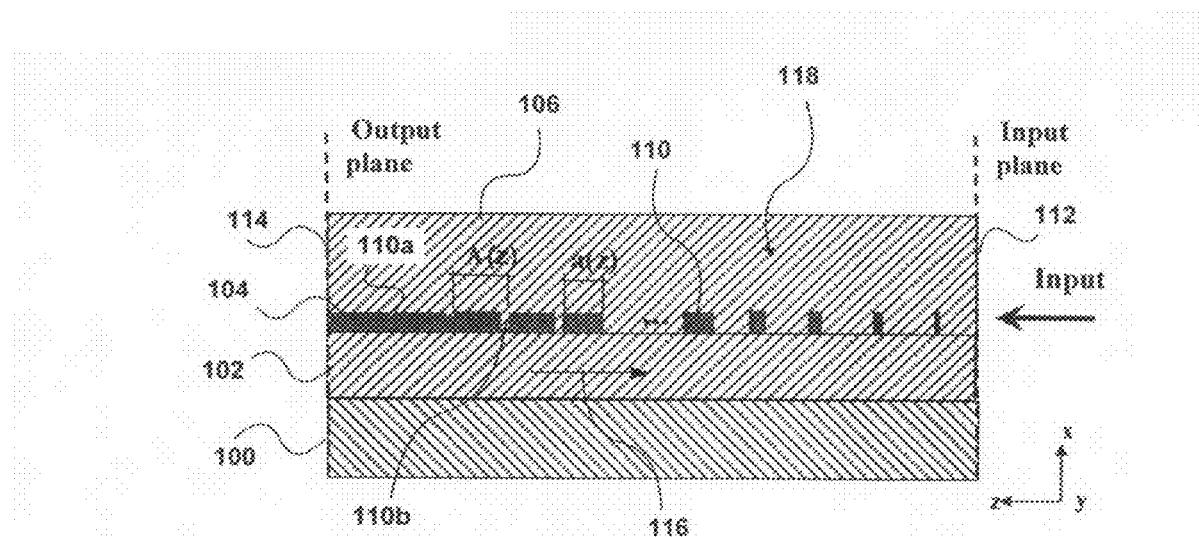
FIGS. 1a to 1c are general schematics of the proposed coupling method, with FIG. 1a showing the cross-sectional view (perpendicular to the chip plane), and FIGS. 1b and 1c showing the in-plane views of SWG structures without and with waveguide width tapering, respectively.

The waveguide structure shown in FIG. 1a, which is suitable for use as a fiber-chip coupler, comprises, in this example, an SOI (silicon-on-insulator) Si substrate 100, an $SiO_2$ bottom cladding layer 102, a silicon waveguide core 104, and an optional $SiO_2$ upper cladding layer 106.

As it approaches the end face of the device, the waveguide core 104 is absent, partially or in full, to form grating elements 110 of a subwavelength grating 118. The pitch of the grating elements 110 is less than the first order Bragg period so as to frustrate diffraction effects. The grating initial modulation depth may be less than the waveguide thickness and thus may not reach the bottom cladding as shown at 110a, 110b. This may arise from the aspect-ratio dependent etching but could also be achieved by gray-scale lithography or other techniques if desired. In this case, the grating depth increases progressively toward the end face 112 until the full depth is reached. The end facet 112 serves in this case as an input port. The opposite end face 114 serves as an output port. The width of the elements a(z) in the longitudinal direction decreases toward the input plane. The pitch $\Lambda(z)$ can be constant, but optionally can increase toward the input plane.

Figure 1B:
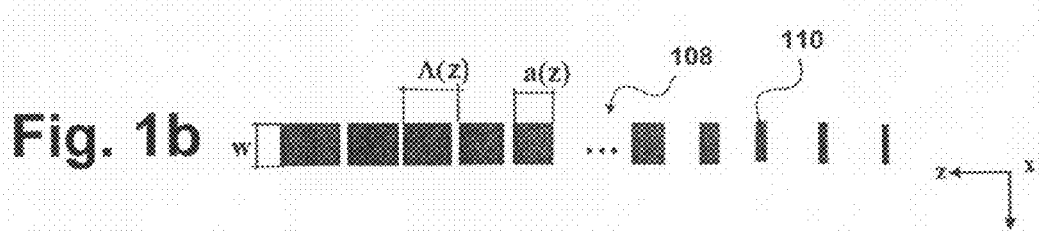
Figure 1C:
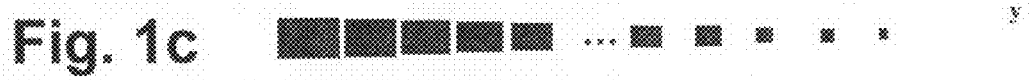

In the embodiment shown in FIG. 1c, the waveguide core 104 is also tapered in lateral direction to increase the effect of the change in the effective mode index.

This embodiment relies on the modification of the waveguide mode effective index by the SWG effect. The waveguide mode effective index is altered by chirping the SWG duty ratio $r(z)=a(z)/\Lambda(z)$, where a(z) is the length of the waveguide core segment and $\Lambda(z)$ is the SWG pitch at the position as shown in FIG. 1. Chirping of the SWG duty ration r(z) can be achieved by chirping either a(z), or both. The effective index of the mode in the SWG coupler increases with the grating duty ratio. The duty ratio and hence the volume fraction of the waveguide core material is modified such that the effective index is matched to the corresponding waveguide structures at the coupler ends.

In the example of fiber-chip couplers, the SWG coupler effective index is matched to an HIC waveguide at one coupler end, while at the other end, near the chip facet, it is matched to the optical fiber or another external optical device. The SWG effect can be advantageously combined with waveguide width tapering (FIG. 1c) and also with SWG segment height and etch depth variations, which can naturally arise from the aspect-ratio dependent etching or be produced by gray-scale lithography or other means near the ends of the coupler (FIG. 3c and FIG. 1a).

Figure 3A:
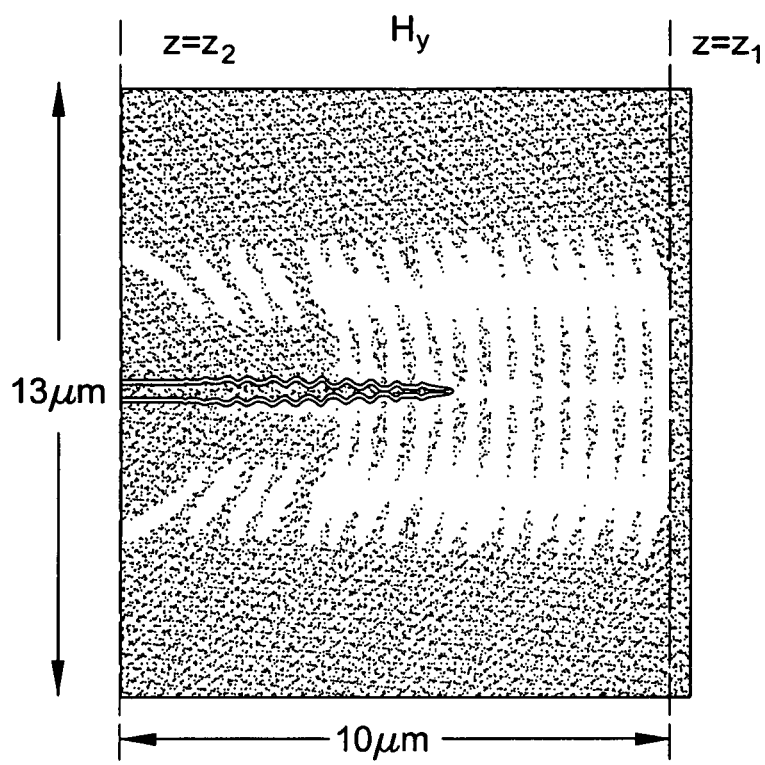
FIGS. 3a and 3b are short SWG input coupler simulations.
Figure 3B:
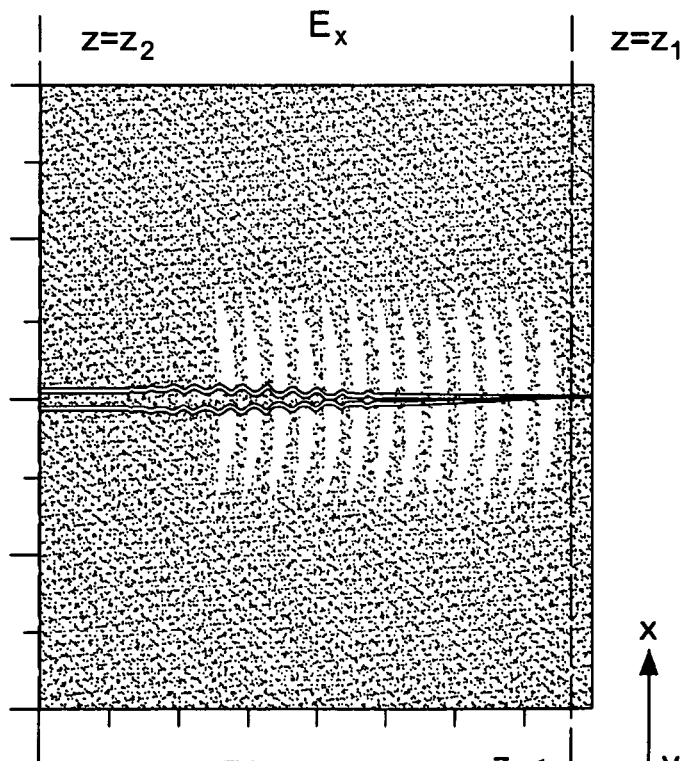
Figure 3C:
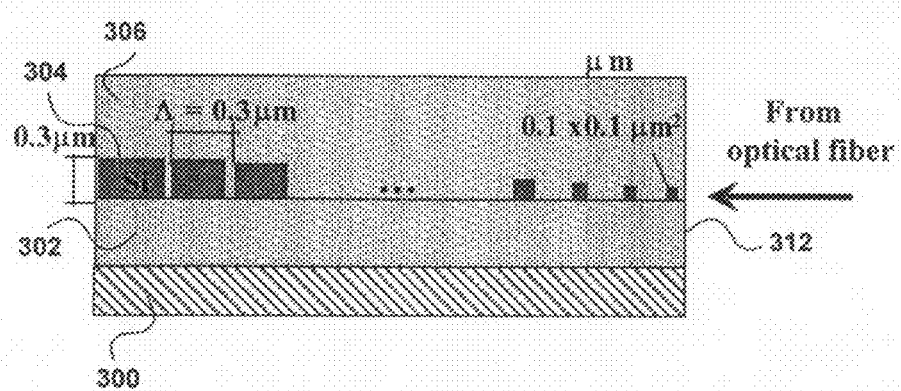
FIG. 3c is a schematic illustration including waveguide height variation, arising, for example, from grating aspect-ratio dependent etching.

The structure shown in FIG. 3c has a silicon substrate 300, and $SiO_2$ bottom cladding layer 302, silicon core 304 and an optional upper cladding layer 306. The initial height of the waveguide, at the output side of the device is 0.3 µm diminishing toward the input face 312, where the size of the grating elements 310 is 0.1×0.1 µm. There are 33 periods of grating element over a total length in the SWG region of 10 µm.

Figure 2A:
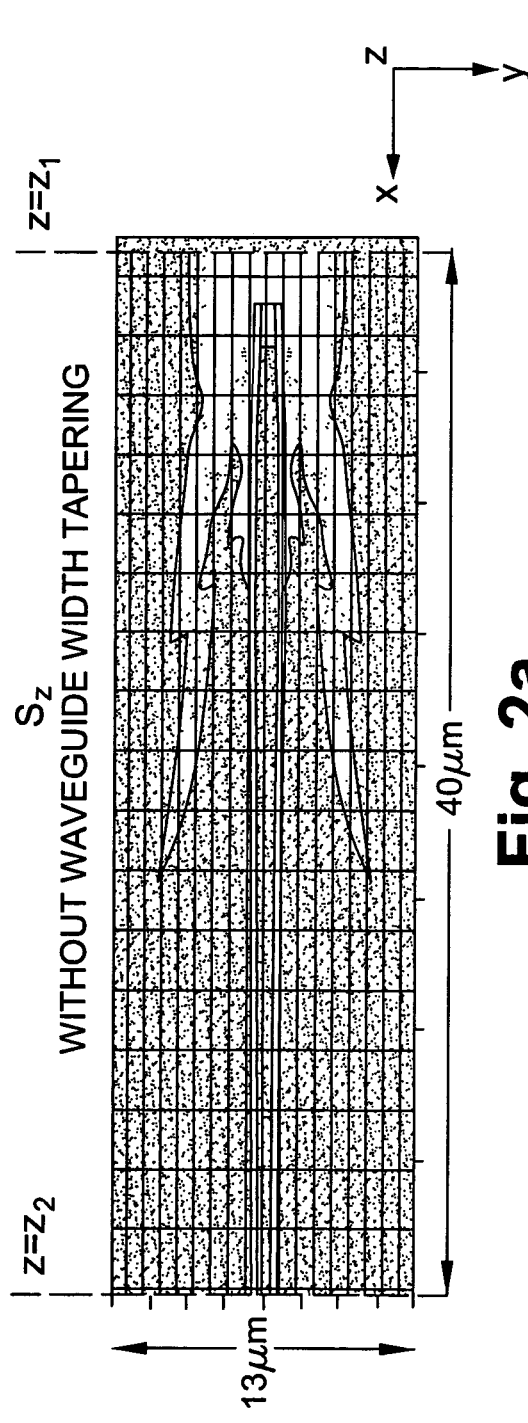
FIGS. 2a and 2b are SWG input coupler FDTD simulations, respectively without and with waveguide width tapering.
Figure 2B:
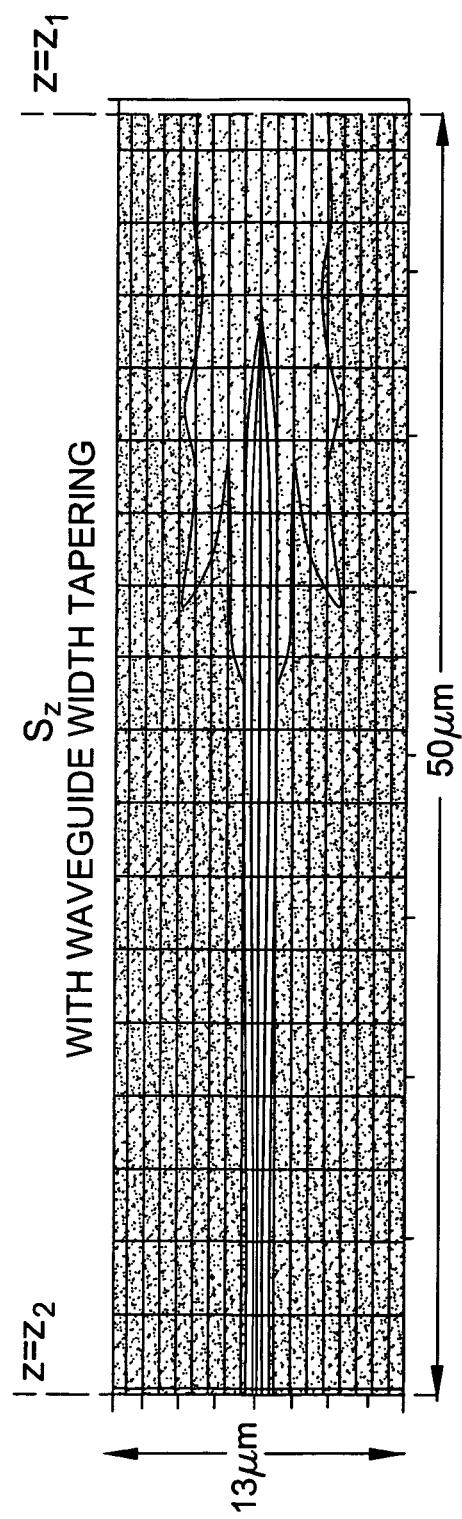

Finite difference time domain (FDTD) simulations of an SOI SWG coupler are shown in FIG. 2, without (FIG. 2a) and with (FIG. 2b) waveguide width tapering effect. A coupler efficiency as high as 76% (1.19 dB loss) was calculated with a 2D Finite Difference Time Domain (FDTD) simulator for coupling between a 0.3 µm SOI waveguide and the SMF-28 fiber. In this example the coupler length is 50 µm.

In most of the simulated couplers, the duty ratio is chirped linearly from $r_{min}$=0.1 at the coupler end facing the fiber to $r_{max}$=1 at the opposite end of the coupler. In structure (H), $r_{min}$~0.33. See Table 1. The coupling structures were simulated for an SOI waveguide with Si core thickness 0.3 µm and $SiO_2$ cladding thickness of 6 µm, with the corresponding refractive indices of $n_{Si}$=3.467 and $n_{SiO2}$=1.45.

In the FDTD calculations, at the input of the coupler ($z=z_1$) a continuous-wave (cw) Gaussian field with a width equivalent to the mode field diameter (MFD) of the optical fiber mode at a wavelength $\lambda$=1.55 µm was assumed. MFD=10.4 µm of an SMF-28 fiber was used, for some structures also compared with MFD=5.9 µm of a C-type high numerical aperture fiber. The SWG waveguide is positioned along the z axis. Typical simulation window dimensions used were 50 µm (propagation direction) by 13 µm (transverse direction). The mesh size was 10 nm in both dimensions and the simulations ran for a total of 20,000 time steps each of $\Delta t=2.2 \cdot 10^{-17}$ s. The time step was chosen according to the Courant limit $\Delta t \leq 1/(c\sqrt{1/(\Delta y)^2+1/(\Delta z)^2})$ to ensure numerical stability of the algorithm. The coupler efficiency was calculated as $\eta=\Gamma P_2/P_1$, where $P_1$ is the input power injected at the right edge of the computation window ($z=z_1$), and $P_2$ is the output power crossing the output plane obtained by integrating the $S_z$ component of the Poynting vector along the left edge of the computation window ($z=z_2$) where the coupler joins the silicon waveguide, and $\Gamma$ is the power overlap integral of the calculated field at the output plane $z=z_2$ with the fundamental mode of the Si waveguide.

The parameters and calculated coupler efficiencies of different structures are summarized in Table 1. FIGS. 2a and b show the Poynting vector component $S_z=Re(E_x H_y^*)/2$ obtained for a 2D FDTD calculation of structures without and with waveguide width tapering, respectively. The structure (A) has an overall length of 40 µm, SWG pitch of 0.2 µm, and the duty ratio r is linearly chirped from 0.1 to 1. The calculated coupling efficiency is 73.3%, hence the coupling loss is 1.35 dB. In FIG. 2a it is observed that the loss is primarily incurred along the first 10 µm of the coupler length. To ease the transition, parabolic rather than linear tapering can be used. Here we include linear waveguide width tapering in two steps (denominated as the waveguide width tapering type 2 in Table 1) because such an approximated structure is easier to script than the ideal (parabolically tapered) SWG and still effectively eases the transition. The structure (D) has the waveguide width linearly tapered from $w_1=30$ nm (at $z=z_1$) to $w=150$ nm along the first ⅔ of the coupler length, and then to $w_2=0.3$ µm (at $z=z_2$). The simulated Poynting vector for this structure is shown in FIG. 2b. The calculated coupler efficiency is 76.1%, corresponding to a loss of 1.19 dB. Only 0.03% of power is reflected back by the SWG, yielding a negligible return loss of −35 dB. Using the same taper with a high-NA fiber, the calculated coupling efficiency is 81.4%, hence a loss of 0.89 dB (structure (E), Table 1). Further loss reduction can be expected by ajudicious design, including parabolic rather then linear tapering of waveguide width and chirping the SWG pitch.

The results were obtained for an input mode with the electric field parallel to the simulation plane shown in FIGS. 2a and 2b. Because these 3D structures were simulated by 2D FDTD which assumes that they are invariant in direction orthogonal to the simulation plane, the 2D simulation is only approximate for electric field polarized along that direction. Also it should be noted that the coupling efficiency of the SWG structures does not vary significantly even for quite large variations in the grating parameters (see Table 1), indicating that the proposed method is robust and potentially tolerant to fabrication errors. For example, an increase in the SWG pitch from 0.2 µm to 0.3 µm results in a negligible excess loss of 0.03 dB, see Table 1, structures (D) and (F).

TABLE 1

The parameters and calculated coupling efficiencies of different SWG structures.

| Coupler | Length L, [µm] | Pitch Λ, [µm] | SWG Periods | Input MFD [µm]# | Waveguide tapering* | Efficiency η, [%] | Loss [dB] |
|---|---|---|---|---|---|---|---|
| A | 40 | 0.2 | 200 | 10.4 | 0 | 73.3 | 1.35 |
| B | 60 | 0.2 | 300 | 5.9 | 1 | 78.6 | 1.05 |
| C | 50 | 0.2 | 250 | 10.4 | 1 | 73.1 | 1.36 |
| D | 50 | 0.2 | 250 | 10.4 | 2 | 76.1 | 1.19 |
| E | 50 | 0.2 | 250 | 5.9 | 2 | 81.4 | 0.89 |
| F | 50 | 0.3 | 166 | 10.4 | 2 | 75.5 | 1.22 |
| G | 50 | 0.4 | 125 | 10.4 | 2 | 66 | 1.8 |
| H | 10 | 0.3 | 33 | 10.4 | 3 | 65.4 | 1.8 |

*Waveguide tapering: 0, no tapering; 1, linear width tapering; 2, two-step linear width tapering; 3, height tapering (aspect ratio dependent etching effect).
Mode field diameters of SMF-28 fiber (MFD = 10.4 µm) and C-type high numerical aperture fiber (MFD = 5.9 µm) measured at $1/e^2$ intensity.
SWG duty ratio is chirped from $r_{min} = 0.1$ to $r_{max} = 1$ for structures (A)-(G), and from $r_{min} = 0.33$ to $r_{max} = 1$ for structure (H).

The simulations show robust coupling tolerances to transverse and angular fiber misalignment for coupling from standard SMF-28 fiber. The transverse misalignments of ±1 µm and ±2 µm result in an increased coupling loss by only 0.07 dB and 0.47 dB, respectively. The angular misalignment tolerance is also large, with only 0.24 dB loss penalty for angular misalignment of ±2 degrees. This is a significant tolerance improvement compared to the inverse taper with the reported misalignment tolerance of 1 dB excess loss for ±1.2 µm transverse misalignment.

Another advantage of the SWG coupler is improved fabrication robustness compared to the inverse taper. FDTD simulation predicts that the tip width of an inverse taper can be increased two-fold, from 100 nm to 200 nm, with no excess loss if the SWG tip structuring is used. In the calculated example, both SWG grating pitch and duty ratio were chirped. The SWG pitch of 0.2 µm and 0.4 µm near the SOI waveguide and the fiber ends, respectively, were used. The minimum duty ratio was r=0.5 at the fiber end.

Scaling of the SWG coupler length down to 10 µm was also demonstrated with an additional ~0.8 dB loss (FIGS. 3a and 3b) compared to a 50 µm long taper. These simulation results should be regarded as only approximate indications of coupler performance and can be further optimized.

Figure 4:
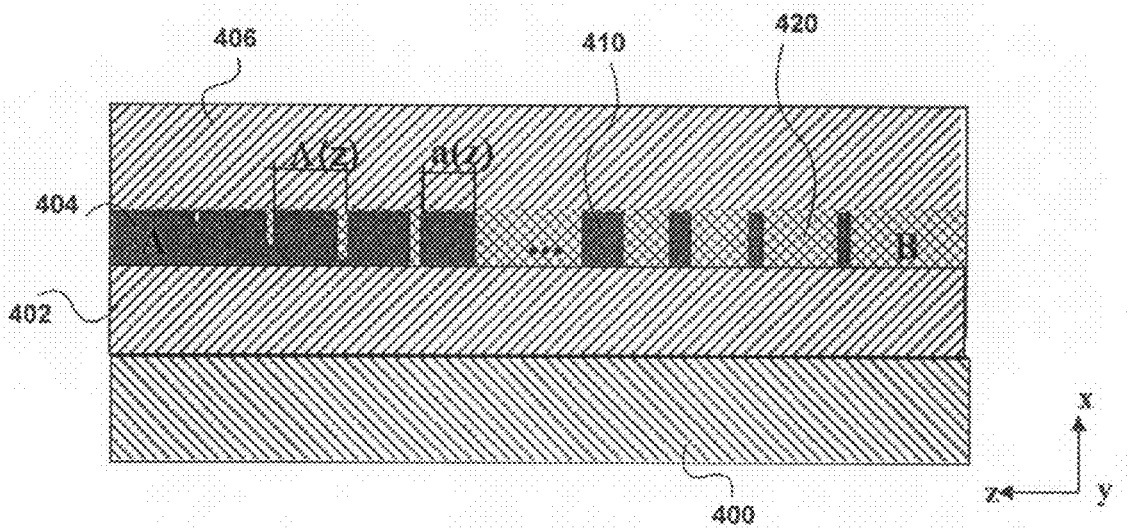
FIG. 4 illustrates a waveguide butt-coupling arrangement.

Another application of gradual modification of waveguide effective index by the SWG principle explained above is butt-joining waveguides with markedly different mode indices. Butt-coupling two waveguides of different material compositions A an B and with effective waveguide mode indices n_eff_A and n_eff_B results in a reflection loss determined by the Fresnel reflection coefficient $R \sim (n\_eff\_A - n\_eff\_B)^2 / (n\_eff\_A + n\_eff\_B)^2$. This reflection loss can be mitigated by connecting the two waveguides via the SWG section with the effective index gradually changing from n_eff_A to n_eff_B. In this case the second waveguide core 420 is interleaved with the first waveguide core 404 as shown in FIG. 4. Like the embodiment shown in FIG. 1, this embodiment comprises an SOI substrate 400, a bottom $SiO_2$ cladding 402, and an optional upper cladding 406. The reflection at the joint is mitigated and both the insertion loss and the return loss are minimized.

For example, when a silicon waveguide is butt-joined with a $Si_3N_4$ waveguide and both waveguides are 0.3 µm thick, the calculated transmission loss for the fundamental mode is low (<0.5 dB) and the return loss is also remarkably suppressed (down to −20 dB).

The same principle can also be used even when the waveguide materials are identical, but the waveguide geometry differs, as for example between a ridge or a channel waveguide and a slab waveguide. By forming the SWG structure in one or both of the waveguides, the effective index is gradually changed, and thus mode matching can be achieved between the two waveguides. This is advantageous for both reduction of excess loss and higher order mode excitation at the junction. This is relevant in a variety of devices, e.g. MMI couplers, arrayed waveguide gratings, waveguide echelle gratings, and other devices containing junctions between waveguides with different geometries.

The SWG effect can also be used to modify mode propagation either by graded-index or by interference phenomena. The latter can be used to advantage in high-reflectivity structures, anti-reflective structures, and apodized apertures, while the former in anti-reflective structures and apodized apertures.

Figures 5A, 5B:
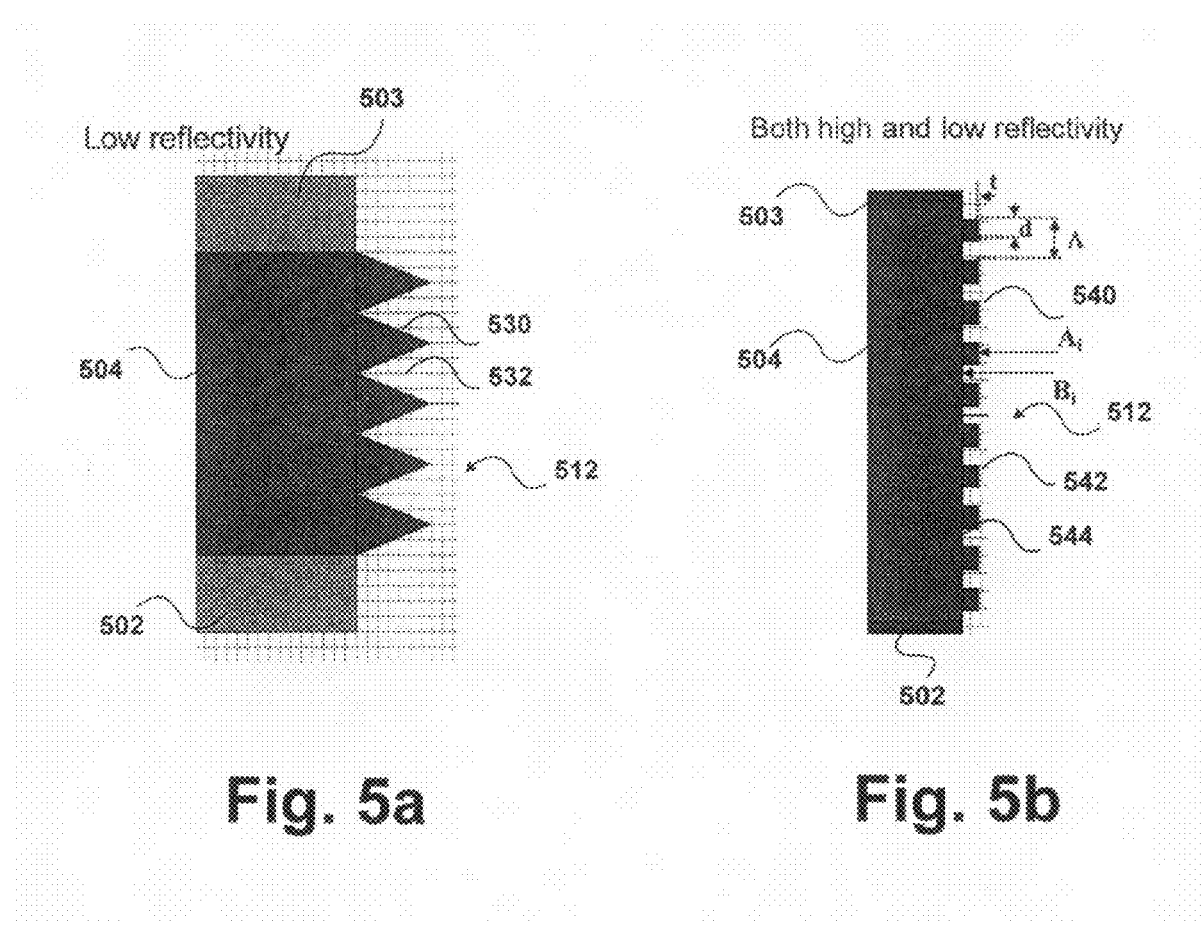
FIGS. 5a and 5b show respectively an in-plane view of triangular and binary SWG structured waveguide facets.

For example, SWG boundaries with high-reflectivity (HR) or low-reflectivity (LR) can be created. In FIG. 5a, the waveguide core 504 between lateral claddings 502 and 503 terminates in an end face 512, which is exposed to the external medium that in this example is air. The end face 512 has triangular facets 530 defining complementary gaps 532 between them. The facets 530 form an SWG.

The reflectivity at the interface is minimized by gradually modifying the waveguide effective index in the vicinity of the facet with the triangular SWG structure as shown in FIG. 5a that effectively results in a graded index facet. The fabrication of these facets can be carried out by well-established standard lithography and etch processes.

Rather than use angular facets as shown in FIG. 5a, an alternative approach is to use a castellated structure 512 on the end face 512 for the SWG as shown in FIG. 5b. This makes a binary SWG. The difference in height between the peaks $A_i$ and valleys $B_i$ results in a phase difference between parts of the light wave at these positions. In order to create an anti-reflective effect, the phase difference should be set such that destructive interference results in backward direction for parts of the wave originating in these extreme positions $A_i$ and $B_i$ of the SWG. The anti-reflective effect is achieved if the phase difference between the reflected parts of the wave originated at the positions $A_i$ and $B_i$ in backward direction is approximately π radians, or an odd multiple thereof, and the amplitudes of these parts of the wave are advantageously of similar magnitude, as required by the two-wave interference condition. This corresponds to a destructive interference condition in reflection. The phase difference and the relative amplitudes of the parts of the wave can be adjusted by controlling the grating modulation depth and duty ratio, respectively. The grating can be configured as SWG for light propagating in one direction only, whereas for the opposite direction it is configured as diffraction grating. This allows using a larger grating pitch. To minimize diffraction loss, it is advantageous to blaze the grating for zero-th diffraction order.

The protrusions forming the castellated structure could be sinusoidal functions or a superposition thereof, or multilevel digital profiles.

Figure 6A:
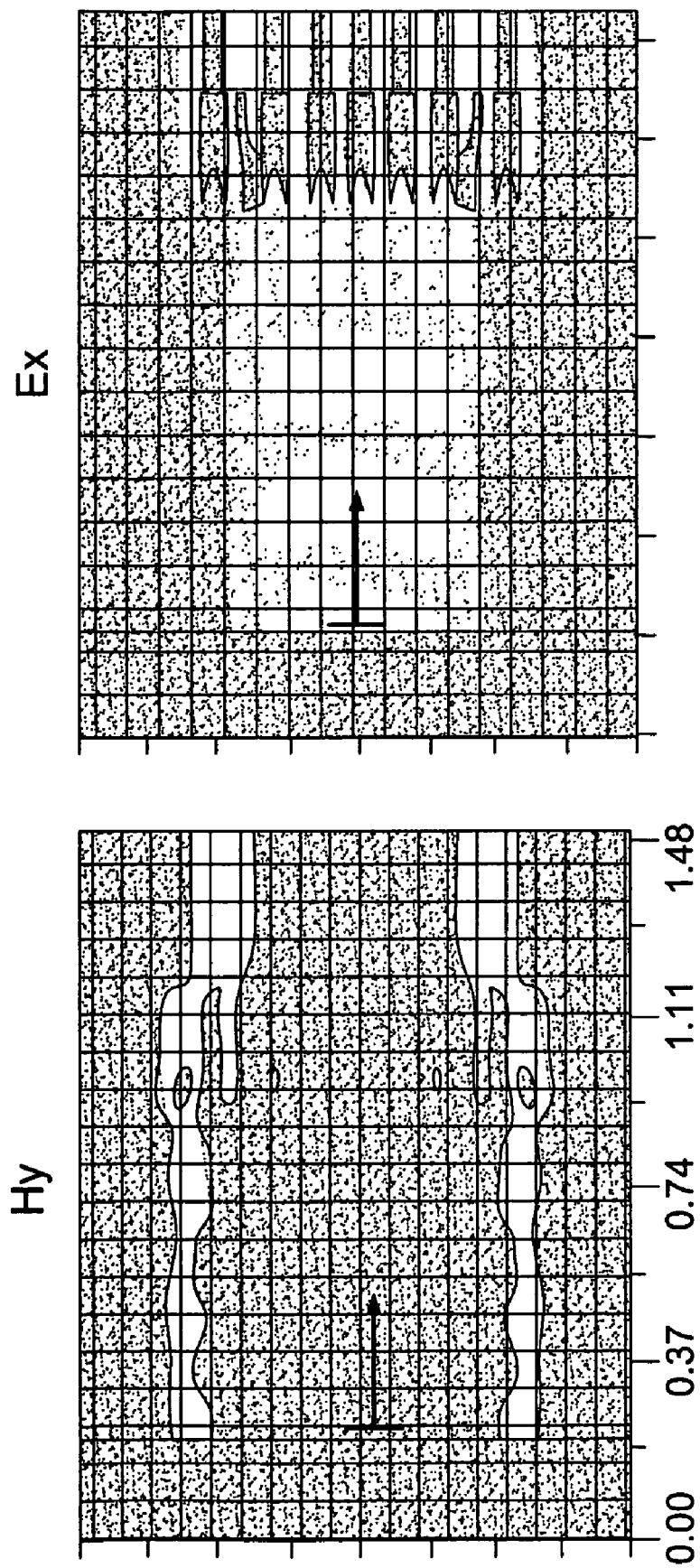
FIGS. 6a and 6b show an SWG waveguide facet FDTD simulation respectively for an anti-reflection facet and high reflectivity facet.

FIG. 6a shows a FDTD simulation of an AR SWG waveguide boundary (facet) with an extremely low reflectivity of R=0.0025. The SWG dimensions are Λ=0.4 μm, d=0.25 μm, t=0.19 μm, where Λ is the pitch, d is the width, and t is the depth of SWG structures, as shown in FIG. 5b. The width of the waveguide facet is 4 μ. The simulations suggest that the SWG effect is robust to variations in Λ, d, and t. This is also corroborated by experimental results.

Figures 7A, 7B:
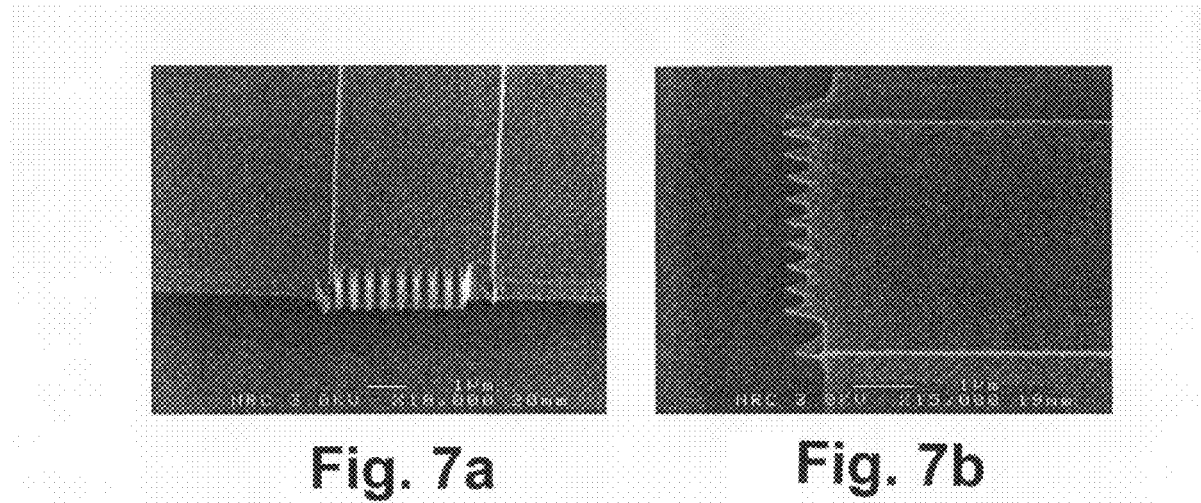
FIGS. 7a and 7b show SEM micrographs of triangular facet SWGs.
Figure 8A:
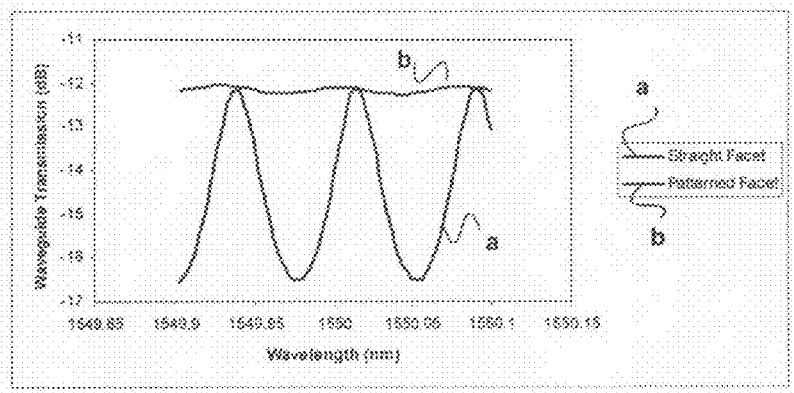
FIG. 8 is an experimental confirmation of an anti-reflecting SWG waveguide facet using a Fabry-Pérot measurement.
Figure 8B:
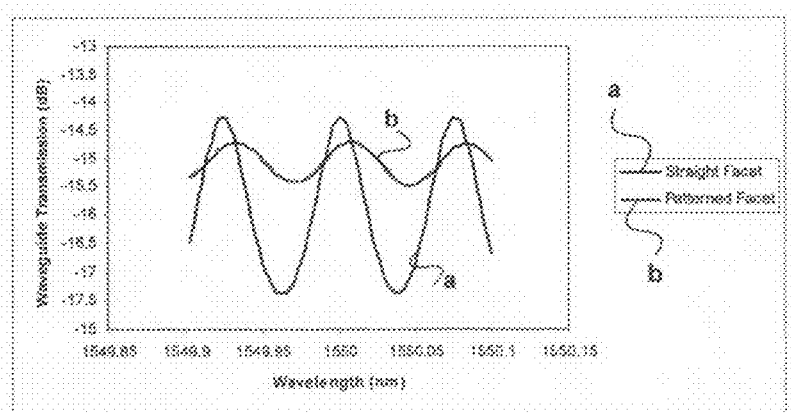

Waveguide facets with a triangular SWG were fabricated as illustrated in FIG. 7. Fabry-Pérot measurements on these structures are shown in FIG. 8, confirming the AR effect. With triangular-like SWG structured facets, the measured reflectivity was reduced from R=0.31 (facets without SWG) down to R=0.009 (facets with SWG) for TE polarization.

Figure 6B:
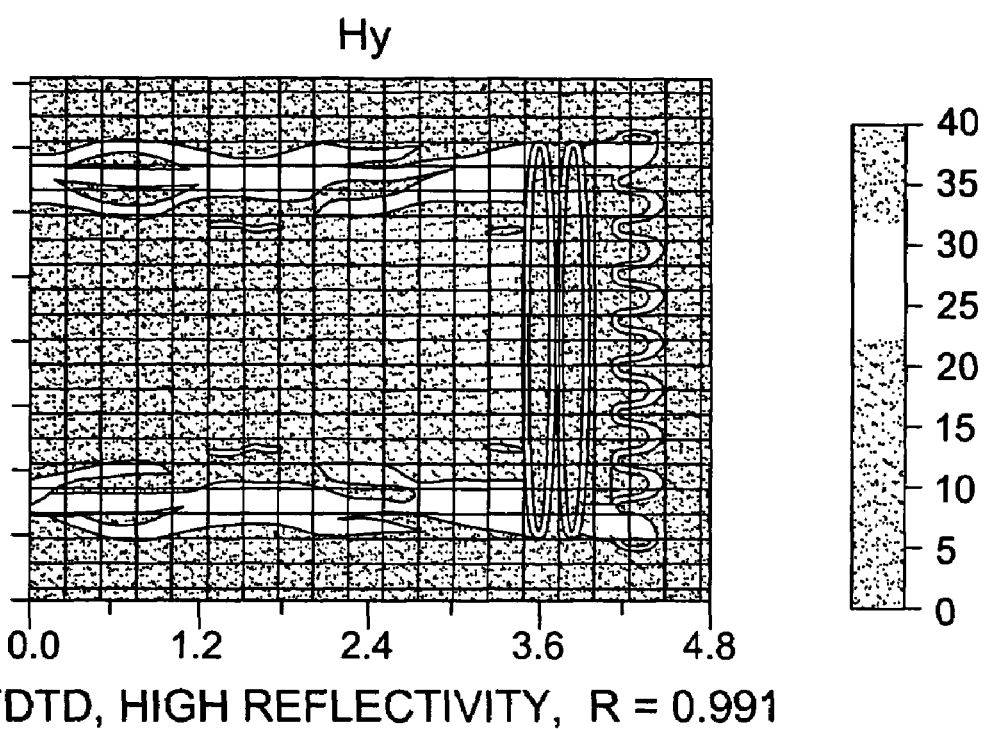

If the phase difference between the adjacent parts of the wave transmitted through the extreme positions ($A_i$ and $B_i$ in FIG. 5b) of the SWG is approximately π radians, or odd multiples thereof, the interference in transmission (forward direction) is destructive. The transmission is suppressed through the SWG boundary with the latter effectively acting as a mirror. FIG. 6b shows FDTD simulation of a high-reflectivity SWG waveguide boundary (facet) with a reflectivity of R=0.991. The SWG dimensions are Λ=0.7 μ, d=0.38 μ, t=0.43 μ (see FIG. 5b). In this design example, the grating is configured as SWG for light propagating in direction from the waveguide to free space, whereas in the opposite direction it is configured as diffraction grating. To minimize diffraction loss, the grating is blazed for zero-th diffraction order.

Forming such SWG boundaries, e.g., on the chip facets, obviates the need for dedicated AR (anti-reflective) or HR (highly reflective) facet coatings. Also, HR and AR SWGs can be formed at internal boundaries of various photonics circuits depending on the phase difference between the peaks and valleys. Furthermore, by combining the HR and AR effects, boundary transmission and reflection can be apodized. Such apodized structures can act as mode selectors and filters, e.g., when making laser facets.

Although the examples illustrate two particular SWG structures, namely the triangular SWG and the rectangular (binary) SWG, more general shapes of the SWG may be used to modify the facet reflectivity. In particular, rounded shapes such as sinoidal function, or more generally, a superposition of sinoidal functions, can be used to ease the fabricated process. Multilevel digital profiles can also be used. Tailoring the shape of the SWG profiles can be used to optimize the performance of the structure, for example the polarization dependence of the AR or HR facets could be minimized or otherwise optimized.

Figure 9A:
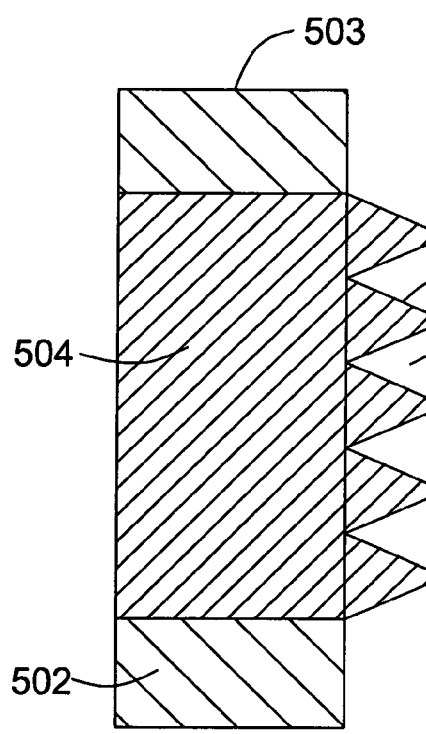
FIGS. 9a and 9b are cross sectional views through an optical fiber with a patterned end face for modified reflectivity similar to FIGS. 5a and 5b.
Figure 9B:
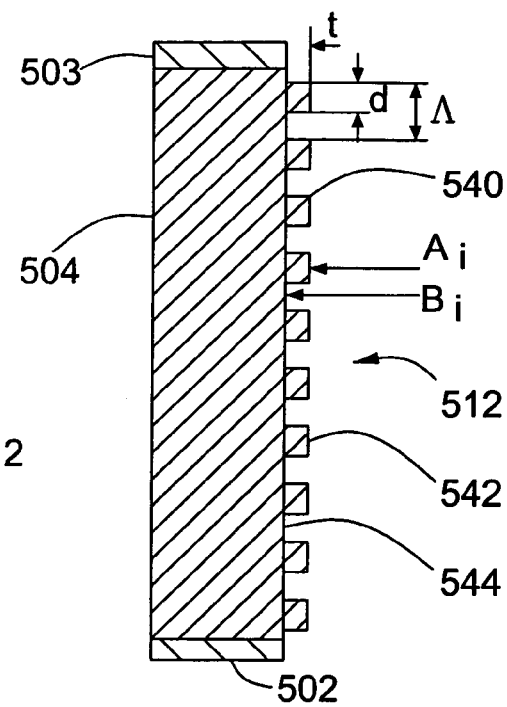

The embodiments described herein can also be implemented in optical fiber waveguides. A first such embodiment is shown in FIGS. 9a and 9b. This embodiment is similar to the embodiment shown in FIGS. 5a and 5b. Like reference numerals are used. In this case, region 504 represents the core of the fiber and region 502 represents the cladding. As in the case of FIGS. 5a and 5b, FIG. 9a shows a triangular grating shape and FIG. 9b shows a square grating shape.

In this embodiment the end face of the optical fiber is patterned with a subwavelength grating in order to modify the reflectivity of that end face. Usually, a low reflectivity will be desired in order to minimize the return loss. The physical effect of changing reflectivity with a patterned end face is the same as described with reference to FIGS. 5a and 5b. The patterning can be limited to the core area of the end face or extend to include part or all of the cladding region.

The pattern can be formed on the end face by ion beam milling, a combination of lithography and etching or other fabrication methods. The subwavelength grating pattern can be one-dimensional or two-dimensional. By one-dimensional, is meant a pattern that is invariant along the direction perpendicular to the plane of the drawing in FIG. 1.

To avoid polarization dependence, patterns which are periodic in both dimensions of the end face can be used. For example, the triangular grating shown in FIG. 1 can consist of a two-dimensional array of pyramids. Patterns with a circular symmetry around the core axis, such as rings on the end face, are also possible.

Figure 10:
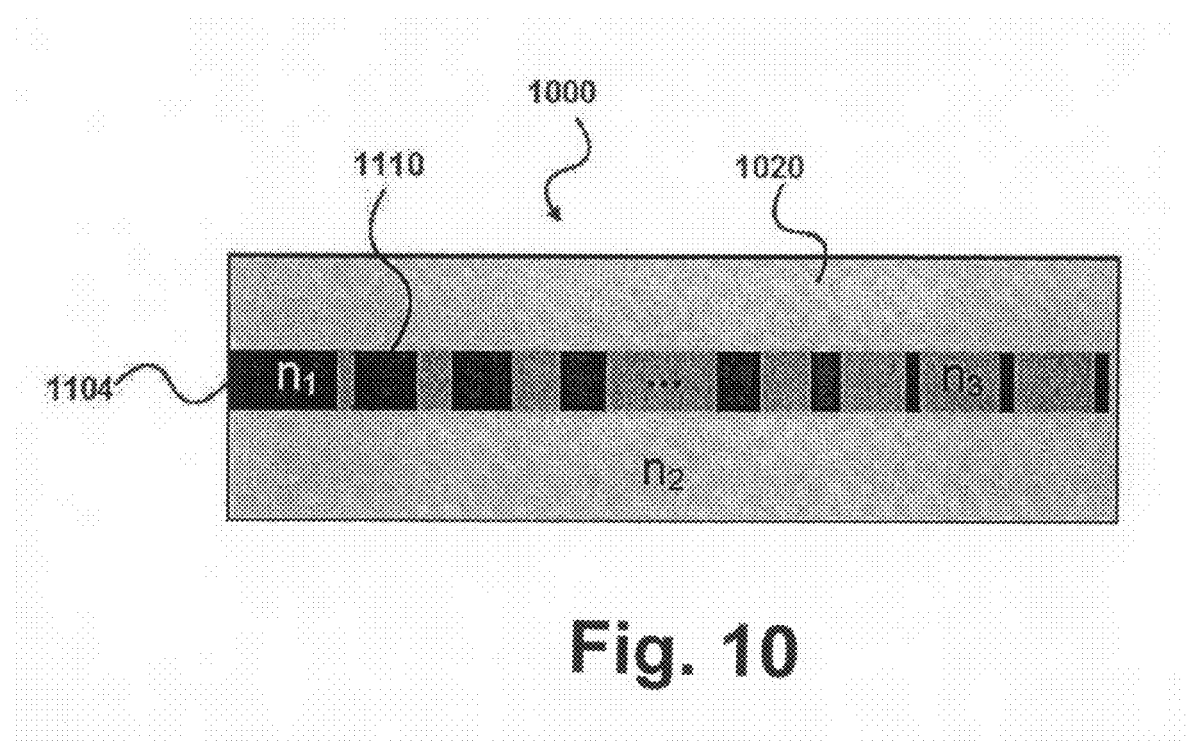
FIG. 10 shows a length of optical fiber with a core index of refraction modulated by a subwavelength grating.

A second embodiment employing optical fibers is illustrated in FIG. 10. This embodiment corresponds to the embodiment shown in FIG. 1, except that the waveguide is an optical fiber 1000, whose core 1104 is modulated with a subwavelength grating 1118, so as to modify gradually the effective index of the mode propagating in the fiber 1000. This can be achieved, for example, by the same fabrication methods used to produce Fiber Bragg Gratings. The core 1104 is surrounded by cladding 1020. The cladding has a refractive index $n_2$, and the interleaved rating elements have respective refractive indices $n_1$ and $n_3$.

It will be appreciated that an aspect of the invention is the SWG mechanism of waveguide mode transformation. Unlike waveguide grating structures based on diffraction, the proposed SWG mechanism is non-resonant, and hence intrinsically wavelength insensitive. Diffraction by the grating is frustrated since the SWG period Λ is less than the 1st order Bragg period $\Lambda_{Bragg} = \lambda/(2n_{eff})$, where $n_{eff}$ is the effective index.

Unlike in conventional long-period mode converters with $\Lambda > \lambda/(2n_{eff})$, the reflection at different sub-wavelength segments is frustrated by the SWG effect. This is achieved irrespective of the waveguide index contrast. This is particularly advantageous for waveguides with large index contrast (SOI, silicon oxynitride, III-V semiconductors, etc.).

The SWG mechanism effects waveguide mode transformation wherein the field distribution, the phase, or both, of a waveguide mode is modified by the SWG effect. The SWG mechanism described can also effect waveguide mode transformation wherein the effective index of a waveguide mode is gradually modified.

We claim:

1. An interface device for performing mode transformation in optical waveguides, comprising:
   a first optical waveguide core for propagating light of a particular wavelength or a plurality of wavelengths in a longitudinal direction through said first optical waveguide core between an input face and an output face;
   a subwavelength grating embedded in said first optical waveguide core;
   said subwavelength grating having a series of transverse grating elements arrayed in said longitudinal direction between said input face and said output face such that light propagating in said first waveguide core between said input face and said output face successively passes said transverse grating elements;
   said grating elements having a pitch sufficiently less than the wavelength of the light to frustrate diffraction; and
   wherein a property of said subwavelength grating varies to effect a gradual change in effective mode index of said first optical waveguide core in the longitudinal direction, said property being selected from the group consisting of: duly ratio, width, pitch, modulation depth, material composition, and any combination thereof; and
   whereby the propagation mode of the light is modified during passage through said first waveguide core between said input face and said output face as said light passes said grating elements.

2. The interface device of claim 1, wherein the width of said first waveguide core tapers in said longitudinal direction.

3. The interface device of claim 2, wherein said first optical waveguide core is embedded in an optical fiber.

4. The interface device of claim 2, further comprising a second optical waveguide core merging into said first optical waveguide core, said first and second optical waveguide cores being of different material and having different mode indices, and wherein said second waveguide core is interleaved with said first waveguide core in the region of said subwavelength diffraction grating so as to form a second subwavelength grating in said second waveguide core, and each of said first and second waveguide cores has a continuous waveguide portion extending away from said subwavelength diffraction gratings.

5. The interface device of claim 4, wherein said first optical waveguide core and said second optical waveguide cores are embedded in an optical fiber.

6. The interface device of claim 1, wherein said grating elements are separated by etch lines, and wherein the depth of said etch lines varies gradually in the longitudinal direction until reaching the full depth of the first waveguide core.

7. The interface device of claim 1, further comprising at least one cladding layer to confine said light to within the waveguide core.

8. The interface device of claim 1, wherein the period $\Lambda$ of the subwavelength grating is less than the $1^{st}$ order Bragg period $\Lambda_{Bragg}=\lambda/(2n_{eff})$, where $n_{eff}$ is the effective index and $\lambda$ is the wavelength of the light.

9. An optical waveguide device effecting mode transformation comprising:
   at least one cladding layer;
   a first waveguide core extending in a longitudinal direction for propagating a light beam of a particular wavelength or plurality of wavelengths between an input face and an output face, said light beam being confined within said first waveguide core by said at least one cladding layer;
   a longitudinal subwavelength grating etched into said waveguide core, said subwavelength grating having a series of transverse grating elements formed from said core and arrayed in said longitudinal direction such that light propagating in said core successively passes said transverse grating elements,
   said transverse grating elements having a pitch sufficiently less than the wavelength of the light beam to frustrate diffraction; and
   said wherein a property of said subwavelength grating varies in the longitudinal direction to provide said first waveguide core with an effective mode index that varies toward said output face.

10. The optical waveguide device of claim 9, wherein the width or pitch of said transverse grating elements varies toward said output face.

11. The optical waveguide device of claim 9, wherein said first waveguide core is made of a material having a higher refractive index than an external input or output waveguide, and the pitch of said grating elements increases toward said output face, or the width of the core material decreases toward said output face, or the pitch of said waveguide elements increases toward said output face and the width of the core material decreases toward said output face.

12. The optical waveguide device of claim 9, wherein said the width of said first waveguide core tapers toward said output face.

13. The optical waveguide device of claim 9, wherein said at least one cladding layer comprises a bottom cladding and an upper cladding layer over said first waveguide core and filling the gaps between said transverse grating elements.

14. The optical waveguide device of claim 9, further comprising a second optical waveguide core having a different effective mode index from said first optical waveguide core, said first and second optical waveguide cores being of different material and having different mode indices, and wherein said first waveguide core merges into said second waveguide core, and said second waveguide core being interleaved with said first waveguide core in the region of said subwavelength grating so as to form a second subwavelength grating in said second waveguide core, and wherein each of said first and second waveguide cores has a continuous waveguide portion extending away from said subwavelength diffraction gratings.

15. The optical waveguide device of claim 14, wherein said first waveguide core and said second waveguide cores are embedded in an optical fiber.

* * * * *